(12) United States Patent
Cho

(10) Patent No.: US 12,457,235 B2
(45) Date of Patent: Oct. 28, 2025

(54) AI-BASED SECURITY RISK PREDICTION SYSTEM AND METHOD FOR TARGETS TO BE PROTECTED IN CLOUD ENVIRONMENT

(71) Applicant: ASTRON SECURITY INC., Seoul (KR)

(72) Inventor: Keun Seok Cho, Anyang-si (KR)

(73) Assignee: ASTRON SECURITY INC., Seoul (KR)

( * ) Notice: Subject to any disclaimer, the term of this patent is extended or adjusted under 35 U.S.C. 154(b) by 340 days.

(21) Appl. No.: 17/893,379

(22) Filed: Aug. 23, 2022

(65) Prior Publication Data

US 2024/0031393 A1  Jan. 25, 2024

(30) Foreign Application Priority Data

Jul. 22, 2022  (KR) .................. 10-2022-0091247

(51) Int. Cl.
*H04L 9/40*  (2022.01)
(52) U.S. Cl.
CPC ...... *H04L 63/1433* (2013.01); *H04L 63/1425* (2013.01)
(58) Field of Classification Search
CPC .. H04L 63/1433; H04L 63/1425; H04L 41/16
See application file for complete search history.

(56) References Cited

U.S. PATENT DOCUMENTS

| | | | |
|---|---|---|---|
| 12,088,616 B2 * | 9/2024 | Shah | G06N 7/01 |
| 2018/0255076 A1 * | 9/2018 | Paine | H04L 63/1416 |
| 2019/0068627 A1 * | 2/2019 | Thampy | H04L 63/1425 |
| 2020/0137097 A1 * | 4/2020 | Zimmermann | H04L 63/1425 |
| 2021/0152555 A1 * | 5/2021 | Djosic | G06N 20/00 |
| 2021/0203673 A1 * | 7/2021 | dos Santos | H04L 63/1433 |
| 2022/0070198 A1 * | 3/2022 | Willis | H04L 63/1425 |

(Continued)

FOREIGN PATENT DOCUMENTS

| | | |
|---|---|---|
| JP | 7121437 B1 | 8/2022 |
| KR | 10-1059199 B1 | 8/2011 |

(Continued)

*Primary Examiner* — Michael Pyzocha
(74) *Attorney, Agent, or Firm* — NKL LAW; Jae Youn Kim

(57) ABSTRACT

Disclosed are artificial intelligence (AI)-based security risk prediction system and method for targets to be protected in a cloud environment. The method includes: collecting cloud logs and system logs for the targets to be protected in real time; learning all activity logs included in the cloud logs and the system logs for the targets to be protected of a corresponding member company through an AI algorithm; identifying a new activity among activities for the targets to be protected based on a learning process through the AI algorithm, and in response to the identified new activity being a new activity related to security, identifying a first activity pattern comprising the corresponding new activity; identifying an order of an preparatory activity for the new activity in the first activity pattern; identifying a risk score corresponding to the order of the preparatory activity for the new activity; and calculating a risk score of each target to be protected by summing identified risk scores of all new activities.

6 Claims, 11 Drawing Sheets

(56) References Cited

U.S. PATENT DOCUMENTS

| | | | |
|---|---|---|---|
| 2022/0210200 A1* | 6/2022 | Crabtree | G06F 16/951 |
| 2022/0217169 A1* | 7/2022 | Varanda | H04L 63/1433 |
| 2022/0225101 A1* | 7/2022 | Fellows | H04L 41/16 |
| 2023/0247048 A1* | 8/2023 | Samosseiko | H04L 63/1425 |
| | | | 726/23 |
| 2023/0306263 A1* | 9/2023 | Zou | G06F 21/552 |
| 2024/0378288 A1* | 11/2024 | Hussain | G06N 5/01 |
| 2025/0036760 A1* | 1/2025 | Asai | G06F 21/57 |

FOREIGN PATENT DOCUMENTS

| | | |
|---|---|---|
| KR | 10-1715179 B1 | 3/2017 |
| KR | 10-2021-0115874 A | 9/2021 |
| KR | 10-2343501 B1 | 12/2021 |
| WO | 2016/138067 A1 | 9/2016 |

* cited by examiner

| Compliance | | | Check Items and Risk Level | |
|---|---|---|---|---|
| Classification | Main Category | Sub-Category | Item Name | Risk Level |
| ISMS-P | 2.5 Certification and Authorization Management | 2.5.1 User Account Management | Update of AWS Account Information | Mid |
| ISMS-P | 2.5 Certification and Authorization Management | 2.5.1 User Account Management | Registration of AWS Account Security Contact | Low |
| ISMS-P | 2.5 Certification and Authorization Management | 2.5.1 User Account Management | Registration of AWS Account Security Question | Low |
| ISMS-P | 2.5 Certification and Authorization Management | 2.5.1 User Account Management | Removal of Root Account Access Key | High |
| ISMS-P | 2.5 Certification and Authorization Management | 2.5.1 User Account Management | Setting of IAM Minimum Password Length | Mid |
| ISMS-P | 2.5 Certification and Authorization Management | 2.5.1 User Account Management | limiting of Number of IAM User Access Key | Mid |
| ISMS-P | 2.5 Certification and Authorization Management | 2.5.1 User Account Management | Management of Rights with Groups When Setting IAM Policies | Mid |
| ISMS-P | 2.5 Certification and Authorization Management | 2.5.1 User Account Management | Whether to Centrally Manage IAM Users | Low |
| ISMS-P | 2.5 Certification and Authorization Management | 2.5.1 User Account Management | Enable of S3 Bucket MFA Delete | High |
| ISMS-P | 2.5 Certification and Authorization Management | 2.5.3 User Authentication | Enable of Root Account MFA | High |
| ISMS-P | 2.5 Certification and Authorization Management | 2.5.3 User Authentication | Enable of Root Account Hardware MFA | Mid |
| ISMS-P | 2.5 Certification and Authorization Management | 2.5.3 User Authentication | Prevention of IAM Password Reuse | Mid |
| ISMS-P | 2.5 Certification and Authorization Management | 2.5.3 User Authentication | Enable of MFA for all IAM users | High |
| ISMS-P | 2.5 Certification and Authorization Management | 2.5.3 User Authentication | Enable of All IAM User Access Keys | High |
| ISMS-P | 2.5 Certification and Authorization Management | 2.5.3 User Authentication | Restriction of Unused Credentials | Mid |
| ISMS-P | 2.5 Certification and Authorization Management | 2.5.3 User Authentication | limiting of the Number of IAM User Access Keys | Mid |
| ISMS-P | 2.5 Certification and Authorization Management | 2.5.3 User Authentication | Setting of Access Key Maximum Usage Time | Mid |
| ISMS-P | 2.5 Certification and Authorization Management | 2.5.3 User Authentication | Management of Rights with Groups When Setting IAM Policies | Mid |
| ISMS-P | 2.5 Certification and Authorization Management | 2.5.3 User Authentication | Enable Access Analyzer for All Regions | Mid |
| ISMS-P | 2.5 Certification and Authorization Management | 2.5.4 Password Management | Prevention of IAM Password Reuse | Mid |
| ISMS-P | 2.5 Certification and Authorization Management | 2.5.5 administer Account and Authentication Management | Enable of Root Account MFA | High |
| ISMS-P | 2.5 Certification and Authorization Management | 2.5.5 administer Account and Authentication Management | Enable of Root Account Hardware MFA | Mid |
| ISMS-P | 2.5 Certification and Authorization Management | 2.5.5 administer Account and Authentication Management | Restriction of Unnecessary Root Account | High |
| ISMS-P | 2.5 Certification and Authorization Management | 2.5.5 administer Account and Authentication Management | Enable of Access Analyzer for all regions | Mid |
| ISMS-P | 2.5 Certification and Authorization Management | 2.5.6 Review of Access Rights | Restriction of Unused Credentials | Mid |
| ISMS-P | 2.5 Certification and Authorization Management | 2.5.6 Review of Access Rights | limiting of the number of IAM user access keys | Mid |
| ISMS-P | 2.5 Certification and Authorization Management | 2.5.6 Review of Access Rights | Setting of Access Key Maximum Usage Time | Mid |
| ISMS-P | 2.5 Certification and Authorization Management | 2.5.6 Review of Access Rights | Management of Rights with Groups When Setting IAM Policies | Mid |
| ISMS-P | 2.5 Certification and Authorization Management | 2.5.6 Review of Access Rights | Removal of Full Control (*.*) policy | High |
| ISMS-P | 2.5 Certification and Authorization Management | 2.5.6 Review of Access Rights | Control of Resource Access Through IAM Roles | Mid |
| ISMS-P | 2.5 Certification and Authorization Management | 2.5.6 Review of Access Rights | Restriction of S3 Bucket HTTP Access | Mid |
| ISMS-P | 2.5 Certification and Authorization Management | 2.5.6 Review of Access Rights | S3 Bucket Data Security | Mid |
| ISMS-P | 2.5 Certification and Authorization Management | 2.5.6 Review of Access Rights | Enable of S3 Bucket 'Block Public Access' | Mid |
| ISMS-P | 2.5 Certification and Authorization Management | 2.5.6 Review of Access Rights | Block Public Access to Cloud Trail Logs | Mid |
| ISMS-P | 2.5 Certification and Authorization Management | 2.5.6 Review of Access Rights | Remote management port settings via network ACLs | High |
| ISMS-P | 2.5 Certification and Authorization Management | 2.5.6 Review of Access Rights | Remote management port setting via Security Group | High |

FIG. 11

AI-BASED SECURITY RISK PREDICTION SYSTEM AND METHOD FOR TARGETS TO BE PROTECTED IN CLOUD ENVIRONMENT

CROSS-REFERENCE TO RELATED APPLICATION

This application claims priority to and the benefit of Korean Patent Application No. 10-2022-0091247 filed on Jul. 22, 2022, the disclosure of which is incorporated herein by reference in its entirety.

BACKGROUND OF THE DISCLOSURE

Field of the Disclosure

The present disclosure relates to a security risk prediction system and method for predicting a security risk for a cloud asset or account of a member company in a cloud computing environment in real time based on artificial intelligence (AI) and notifying a prediction result.

Related Art

Cloud computing is attracting attention as it allows companies, government agencies, and individuals to secure as many IT resources as they want quickly and without additional investment. Currently, representative companies that provide cloud computing services include Amazon, Microsoft, Google, and Oracle. Cloud computing services provided by Amazon, Google, Microsoft, and Oracle are called Amazon Web Services (AWS), Google Cloud Platform (GCP), Azure, and Oracle Cloud (OCI), respectively.

Take Amazon's AWS as an example. A Cloud computing network provided by these cloud providers is divided into a plurality of regions, and each of the plurality of regions includes a plurality of Availability Zones (AZ). In addition, each of the plurality of available services includes a plurality of virtual private clouds (VPCs), each of the plurality of VPCs includes a plurality of subnets, and each of the plurality of subnets includes a gateway, a network firewall, and a cloud asset. Cloud assets are virtual hosts (i.e., virtual servers), databases and containers.

In a cloud computing environment, security policies and firewall policies for each cloud asset are set, and access restrictions such as a password for restricting access control are set for each cloud asset.

However, cloud assets are of different environments depending on a member company, and management of the cloud assets is cumbersome and complicated due to frequent creation, deletion, and change. In addition, a risk of hacking in a cloud system is gradually increasing.

When an actual hacking occurs in such a cloud computing environment, it is difficult to quickly identify and respond to the cause. Therefore, it is the most effective security measure to predict and prepare for anomalies in order to quickly identify and respond to the cause.

RELATED DOCUMENT

Patent Document (Patent Document 1) Korean Patent No. 10-2343501 (Registered on Dec. 22, 2021)

SUMMARY

An aspect of the present disclosure provides an AI-based security risk prediction system and method for targets to be protected in a cloud environment, wherein anomalies in advance for a cloud asset vulnerable to security identified through vulnerability diagnosis are predicted and a risk prediction value is notified to a relevant member company.

Another aspect of the present disclosure provides an AI-based security risk prediction system and method for targets to be protected in a cloud environment, wherein a new activity different from the usual ones of individuals is identified through artificial intelligence, and is used to predict security risks depending on whether the new activity is a malicious preparatory activity that adversely affect security.

In an aspect of the present disclosure, artificial intelligence (AI)-based security risk prediction system for targets to be protected in a cloud environment, the system is provided, and the system includes: an information collector configured to perform API communication with a cloud system to collect cloud logs and collect system logs from agents of cloud assets; an information classifier configured to classify and store the cloud logs and the system logs by each member company and each target to be protected; an activity learning part configured to learn an activity log collected in real time by the information collector so as to identify whether a new activity has occurred, and in response to occurrence of the new activity, identify an activity pattern including the new activity; a risk identifier configured to, in response to receiving the new activity and the activity pattern for each target to be protected, identify an order of a preparatory activity for the new activity in the activity pattern; and a prediction score calculator configured to identify the order of a preparatory activity for the new activity, identify a preset risk score of the identified order, and calculate a risk score of a corresponding target to be protected by summing risk scores of all new activities.

The system may further include: a vulnerability diagnosis part configured to perform vulnerability diagnosis on each target to be protected of each member company based on vulnerability diagnosis information included in the cloud logs and the system logs; a target selector configured to identify and manage a vulnerability status of each target to be protected based on a result of the vulnerability diagnosis performed by the vulnerability diagnosis part, and select a first prediction target, which is a new security threat object, based on a result of currently performed vulnerability diagnosis on each target to be protected; and an activity log extractor configured to identify a vulnerability progress period in which a vulnerability status of the first prediction target has changed from a safe status to an insecure status, and extract an activity log of the vulnerability progress period. The activity learning part may be further configured to identify a first new activity of the first prediction target and a new activity pattern including the first new activity by leaning the activity log during the vulnerability progress period, and identify a second new activity of each of the first prediction target and a preset second prediction target and a second activity pattern including the second new activity by learning a real-time activity log for each of the first and second prediction targets. The risk identifier may be further configured to identify an order of a preparatory activity for the first new activity in the first activity pattern, and identify an order of a preparatory activity for the second new activity of each of the first and second prediction targets in the second activity pattern. The prediction score calculator may be further configured to identify a preset risk score corresponding to the order of the preparatory activity for the first new activity of the first prediction target, calculate a primary risk score of the first prediction target by summing identified risk scores of first new activities, identify a preset risk score corresponding to the order of the preparatory activity for the second new activity of each of the first and second prediction targets, calculate a secondary risk score of each of the first and second prediction targets by summing identified risk scores of second new activities, and calculate a final risk score of each of the first and second prediction target by summing the primary and secondary risk scores.

The corresponding target to be protected may be at least from among all individual accounts and all cloud assets owned by each member company.

The risk identifier may be further configured to: in response to the second activity pattern being a new activity pattern, identify an order of a preparatory activity for the second new activity, and in response to the second activity pattern being not a new activity pattern but a previously identified activity pattern, set a risk flag for the second activity pattern.

In another aspect of the present disclosure, an artificial intelligence (AI)-based security risk prediction method for targets to be protected in a cloud environment is provided, and the method includes: collecting cloud logs and system logs for the targets to be protected in real time; learning all activity logs included in the cloud logs and the system logs for the targets to be protected of a corresponding member company through an AI algorithm; identifying a new activity among activities for the targets to be protected based on a learning process through the AI algorithm, and in response to the identified new activity being a new activity related to security, identifying a first activity pattern including the corresponding new activity; identifying an order of an preparatory activity for the new activity in the first activity pattern; identifying a risk score corresponding to the order of the preparatory activity for the new activity; and calculating a risk score of each target to be protected by summing identified risk scores of all new activities.

In yet another aspect of the present disclosure, there is provided an artificial intelligence (AI)-based security risk prediction method for targets to be protected in a cloud environment, and the method includes: performing vulnerability diagnosis on the targets to be protected based on cloud logs and system logs for the targets to be protected of each member company; selecting, as a first prediction target, a target to be protected of which a vulnerability status has changed to an insecure status according to a result of the vulnerability diagnosis among the respective targets to be protected; identifying a vulnerability progress period for the first prediction target; extracting an activity log related to the first prediction target during the vulnerability progress period and learning the extracted activity log through an AI algorithm; identifying a first new activity for the first prediction target and a first activity pattern including the first new activity based on a learning process through the AI algorithm; identifying an order of a preparatory activity for the first new activity in the first activity pattern; identifying a risk score corresponding to the order of the preparatory activity for the first new activity; calculating a primary risk score of the first prediction target by summing any of the identified risk score of the first new activity; learning, through an AI algorithm, an activity log received in real time for each of the first prediction target and a second prediction target preset in the insecure status; identifying a second new activity of each of the first and second prediction targets and a second activity pattern including the second new activity based on a learning process through the AI algorithm; identifying an order of a preparatory activity for the second new activity in the second activity pattern; identifying a risk score corresponding to the order of the preparatory activity for the second new activity; calculating a secondary risk score of each of the first and second prediction targets by summing identified risk scores of second new activities; and calculating a final risk score by summing the secondary risk score and the primary risk score,

BRIEF DESCRIPTION OF THE DRAWINGS

FIG. 11 is a check list of possibly vulnerable items according to an embodiment of the present disclosure.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In describing the present disclosure, if it is determined that a detailed description of known functions and components associated with the present disclosure unnecessarily obscure the gist of the present disclosure, the detailed description thereof will be omitted.

It will be understood that, although the terms "first," "second," etc. may be used herein to describe various elements, these elements should not be limited by these terms.

The singular forms are intended to include the plural forms as well, unless the context clearly indicates otherwise.

In the present application, steps described may be performed regardless of a listed order, except for a case where they must be performed in the listed order due to a special causal relationship.

It should be noted that the terms "include" or "have" as used in the present disclosure are intended to denote the existence of any features, numerical values, steps, operations, constituent elements, parts, and combinations thereof described in the specification, but are not intended to preliminarily exclude the possibility of existence or addition of any one or more other features, numerical values, steps, operations, constituent elements, parts, and combinations thereof.

Hereinafter, the present disclosure will be described with reference to the accompanying drawings.

Figure 1:
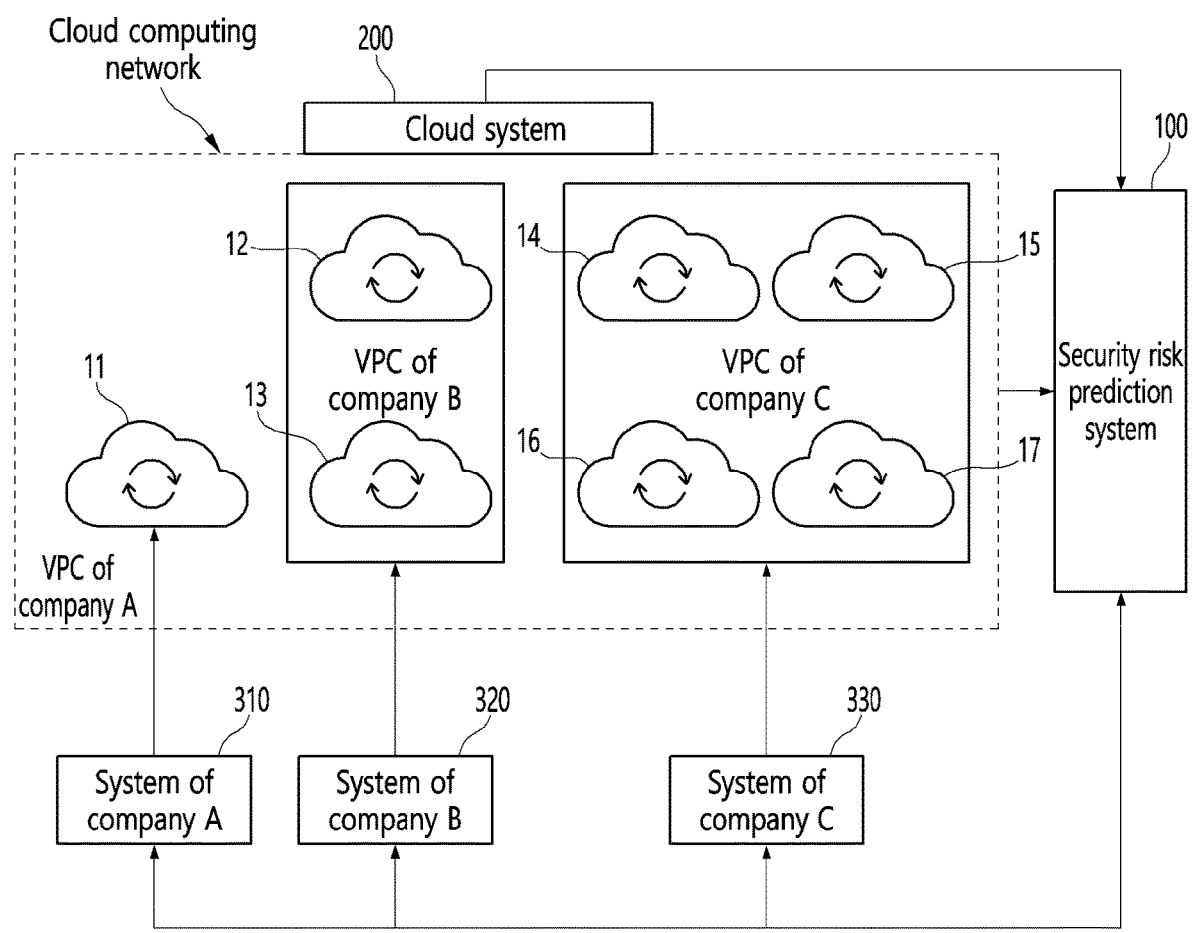
FIG. 1 is a diagram illustrating a network environment of an AI-based security risk prediction system for targets to be protected in a cloud environment according to an embodiment of the present disclosure.

FIG. 1 is a diagram illustrating a network environment of an AI-based security risk prediction system for targets to be protected in a cloud environment according to an embodiment of the present disclosure. Referring to FIG. 1, in a cloud computing environment, a member company of a cloud service provider, that is, a company, a national institution, or the like may create and use at least one Virtual Private Cloud (VPC), and each member company may establish and operate a different cloud environment. For example, company A may own and operate one VPC 11, company B may own and operate two VPCs 12 and 13, and company C may own and operate four VPCs 14, 15, 16 and 17.

In addition, in a VPC for each member company, the number of subnets in the VPC and the number of cloud assets in each subnet may vary from company to company. Here, the cloud assets may include a virtual host, a container, and a database.

Meanwhile, each member company may first create and register a member company account to access a cloud system 200, and then may create, register, and use at least one personal account to be used by an individual (or group).

The cloud system 200, which is a cloud operator's system, may support creation of a VPC, creation of subnets, and creation of cloud assets. In addition, the cloud system 200 may set and register security policies, account information, environment setting information, firewall information, and the like for a VPC and subnets and may generate a log whenever each information is generated. Hereinafter, any type of log generated by the cloud system 200 may be collectively referred to as "cloud log".

The cloud log may include a log of work done by each worker of a member company using a console, a log of work done by each worker of a member company using a Command Line Interface (CLI), and a log of work done using an Application Programming Interface API) program. In addition, each cloud log may include identification information of a corresponding account and identification information of a corresponding network asset.

Such a cloud log may include, for example, security policies and account information for a VPC and subnets, environment setting information, a log for firewall information, and an activity log of a worker performed in the cloud system 200 (hereinafter, referred to as a "first activity log"). The first activity log may be information on a physical activity performed by a worker through a corresponding account. For example, the physical activity may be, for example, an activity to access a cloud system, an activity to change account rights, an activity to change firewall policies, an activity to query material information, an activity to opens a port, an activity to access any folder, an activity to run an arbitrary program, an activity to copy, an activity to send an e-mail, an activity to change a password, an activity to change or delete information, an activity to install a new program or image, or the like.

Meanwhile, a cloud asset, that is, a virtual host, a container, or a database may generate a log corresponding to an event input by a worker of a member company or a log generated by itself, and may provide the generated log to a security risk prediction system 100. Hereinafter, any type of log generated by a cloud asset may be collectively referred to as "system log". Each cloud log may include identification information of a corresponding account and identification information of a corresponding network asset.

A system log may include account information, setting information, status information, traffic information, and the like of each cloud asset, and may also include an activity log of each account performed in a corresponding cloud asset (hereinafter, referred to as a "second activity log"). The second activity log may be information on a physical activity performed by a worker, like the first activity log.

Figure 2:
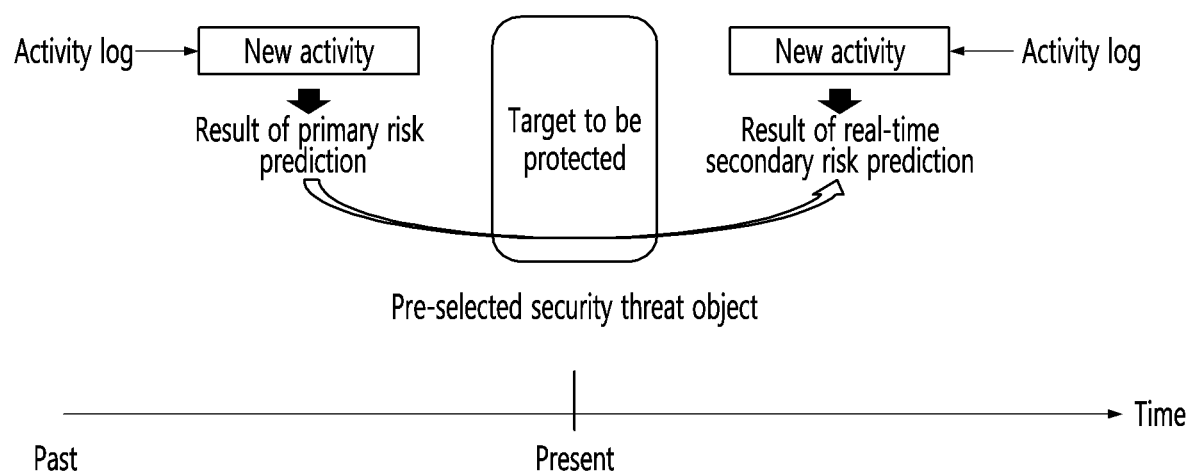
FIG. 2 is a conceptual diagram of a security risk prediction service according to a first embodiment of the present disclosure.

FIG. 2 is a conceptual diagram of a security risk prediction service according to a first embodiment of the present disclosure. Referring to FIG. 2, a security risk prediction service according to the first embodiment of the present disclosure may be a service provided to each member company, may be provided for each member company, and may be targeted to each target to be protected of each member company. A target to be protected may mean a target that needs protection against a security threat, and may be in a broad sense at least one of an account and a cloud asset.

The account may be an access right to access a cloud computing environment, and may be largely divided into a member company account and at least one individual account. The member company account may be an account that is created when a company or government institution is first registered as a service member, and the individual account may be an account that is created after accessing with the member company account. Cloud assets may include a virtual host, a container, and a database.

In the security risk prediction service according to the first embodiment of the present disclosure, a new activity, which is a first activity occurring regarding a target to be protected, and an activity pattern including the new activity may be identified by learning a system log and a cloud log, which are collected in real time regarding one target to be protected, and a security risk may be predicted depending on a position of the new activity in the activity pattern.

The new activity may be a first activity log collected regarding the target to be protected.

The activity pattern may include a plurality of activities generated by the corresponding account in a chronological order in the cloud system 200 or the corresponding cloud assets. For example, the activity pattern may be a sequence made in a temporal sequence, such as an activity to access, an activity to check a specific file after access, an activity to check the specific file and copy the contents thereof, and an activity to send the copied contents by e-mail, and the like.

The new activity and activity pattern may be identified by analyzing the vast activity loges regarding the account, and an artificial intelligence algorithm may be used for this analysis.

The security risk prediction service according to the first embodiment of the present disclosure may allow an AI algorithm to learn only a security-related activity log after excluding a non-security-related activity log from among the first activity log and the second activity log.

In FIG. 2, a primary risk prediction result is a risk prediction result obtained by performing at an earlier time close to a current time, and a secondary risk prediction result is a risk prediction result obtained using log information currently received in real time.

Figure 3A:
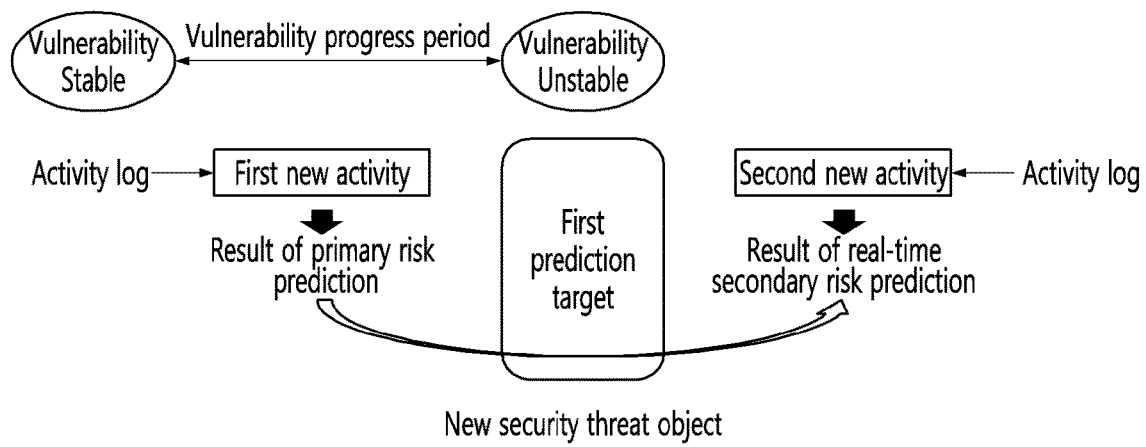
FIGS. 3A-3B are conceptual diagrams of a security risk prediction service according to a second embodiment of the present disclosure.
Figure 3B:
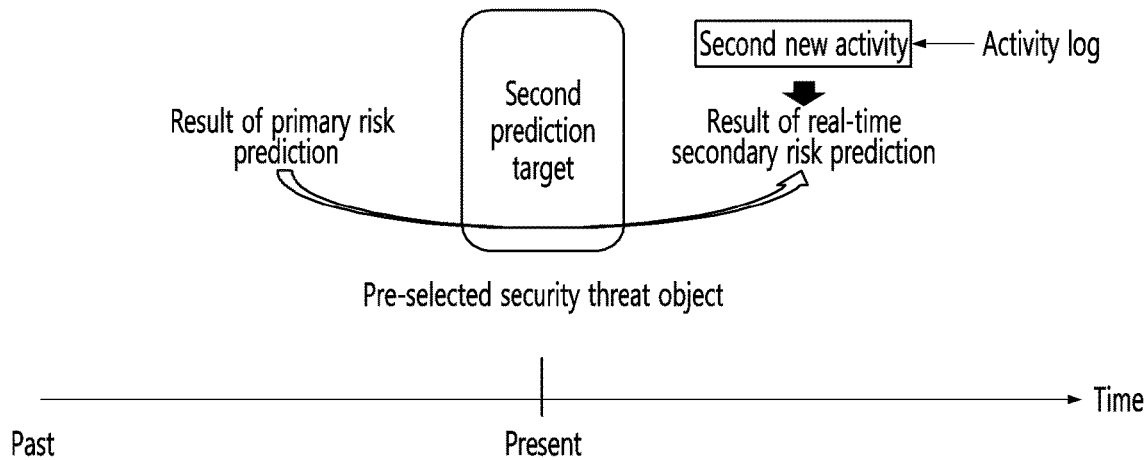

FIGS. 3A-3B are conceptual diagrams of a security risk prediction service according to a second embodiment of the present disclosure. Referring to FIGS. 3A-3B, the security risk prediction service according to the second embodiment of the present disclosure may be targeted to a target to be protected, whose vulnerability status identified through vulnerability diagnosis is an insecure status. Accordingly, a security risk prediction service according to an embodiment of the present disclosure may be targeted to a target to be protected whose vulnerability status is an insecure status among targets to be protected (individual accounts and/or cloud assets) owned by a member company based on one member company.

Here, the target to be protected whose vulnerability status is an insecure status may be divided into a target to be protected which is newly added as a target of security threat through a currently performed vulnerability diagnosis (hereinafter, referred to as a "first prediction target") as shown in FIG. 3A and a pre-selected target of security threat which has been identified as a target of security threat through a previous vulnerability diagnosis and has so far remained as a security threat target (hereinafter, referred to as a "second prediction target") as shown in FIG. 3B.

In the security risk prediction service, primary risk prediction may be performed using an activity log (including the first and second activity logs) during a vulnerability progress period, which is a period from a time when a vulnerability status of the prediction target is safe to a time when the vulnerability status becomes insecure. The activity log used for the primary risk prediction may be at least one activity log that is newly generated for the first prediction target and related to security (hereinafter, referred to as a "first new activity").

The first new activity may be an activity log first collected for the first prediction target, and the first new activity may be utilized as an activity pattern composed of two or more activity logs including the first new activity itself (hereinafter, referred to as a "first activity pattern"). The first new activity or the first activity pattern may be identified by analyzing a massive amount of activity logs for a corresponding account, and an artificial intelligence algorithm may be used for the analysis.

Then, in the security risk prediction service, the activity logs (including the first and second activity logs) received in real time for the first and second prediction targets may be learned through an AI algorithm to identify a new activity and secondary risk prediction may be performed using the new activity. The new activity used for secondary risk prediction may be referred to as a secondary new activity. Likewise to the first new activity, the second new activity may be an activity log first collected for the first prediction target. In addition, an activity pattern composed of two or more activity logs including the second new activity may be referred to as a "second activity pattern". A result of the secondary risk prediction may be calculated by reflecting a result identified based on the relationship between the first new activity and the second new activity to a result of the primary risk prediction.

In the security risk prediction service according to the second embodiment of the present disclosure, the AI algorithm may exclude non-security-related activity log from among the first activity log and the second activity log and learn only security-related activity log therefrom.

Figure 4:
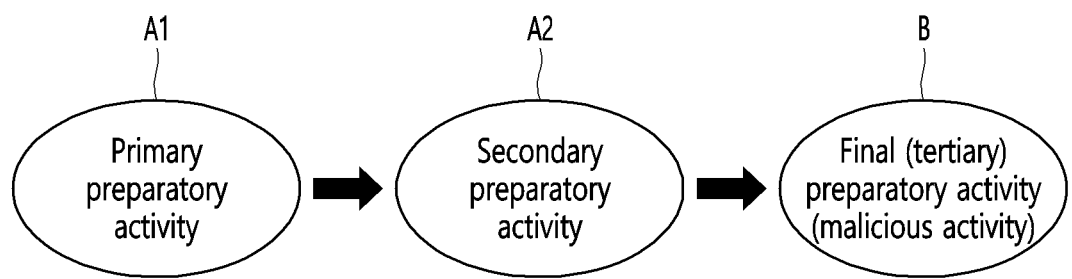
FIG. 4 is a diagram for explaining an activity pattern according to an embodiment of the present disclosure.

An activity pattern will be described in more detail with reference to FIG. 4. FIG. 4 is a diagram for explaining an activity pattern according to an embodiment of the present disclosure. An activity pattern may include a plurality of related preparatory activities A1, A2, and B. Although it is shown that there are two preparatory activities in FIG. 4, there may be three or four or five or more preparatory activities. The preparatory activities A1, A2, and B may be classified into: a final (or tertiary) preparatory activity, that is, a malicious activity B that poses a security threat; and a primary preparatory activity A1 secondary preparatory activity A2, which are to be performed prior to the malicious activity B.

For example, suppose that there is an activity pattern including: an activity to access the cloud system 200 or a corresponding cloud asset; an activity to check a password file after access; an activity to copy the main contents after checking the password file, and an activity to send the copied main contents by e-mail or the like.

In this case, the malicious activity B may correspond to the activity to send the copied main content by e-mail or the like, and the preparatory activities A1 and A2 may be the activity the check the password file after access and the activity to copy the main content after checking the password file. Here, the activity to copy the main contents after checking the password file does not precede the activity to check the password file in terms of time, and the activity to check the password file should be performed first for the activity to copy the main contents of the password file.

Therefore, the activity to check the password file is the primary preparatory activity A1 which proceeds for the secondary preparatory activity, and the activity to copy the main contents is the secondary preparatory activity A2 which proceeds for the malicious activity B. The primary preparatory activity A1, the secondary preparatory activity A2, and the malicious activity B may be related to one another.

In addition, if a new activity (the primary preparatory activity A1) to check a password file, which has not been done in a first account, is performed, it is naturally determined that there is a security risk probability, and if a new activity (the secondary preparatory activity A2) to copy the main contents of the password file, which has not been done in the first account, is performed after the primary preparatory activity A1, it is naturally determined that a probability of security risk is higher than during the primary preparatory activity A1. Also, if a new activity (the malicious activity B) to transmit the copied main contents by e-mail, which has not been done in the first account, is performed, it is naturally determined that a probability of security risk is higher than during the secondary preparatory activity A2.

Therefore, in one activity pattern, the lower the order of a preparatory activity, the lower a security risk, and the higher the order of a preparatory activity, the higher a security risk. The order of the preparatory activity may correspond to relevance to any other preparatory activity in the same pattern and may be used in calculating a risk score.

Figure 5:
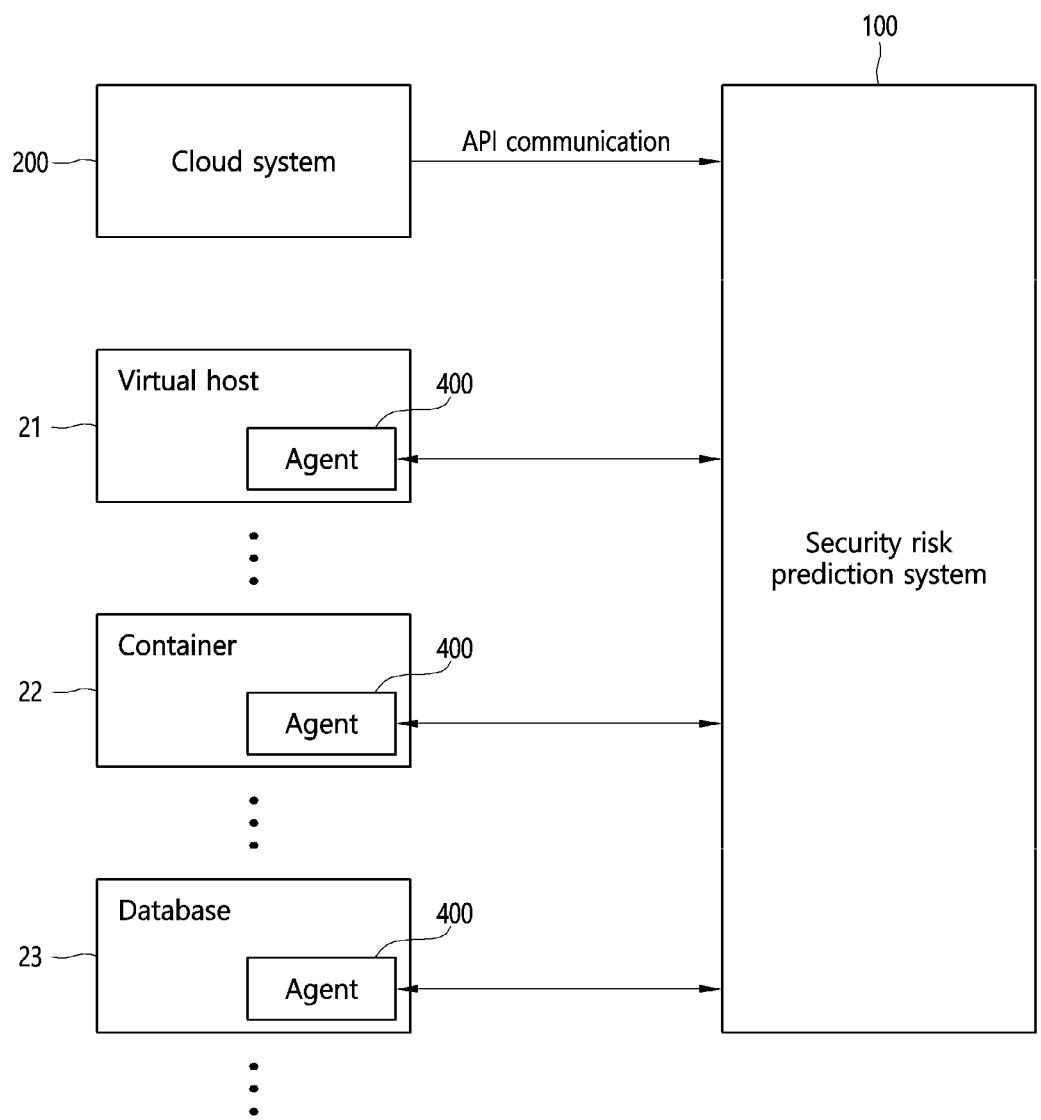
FIG. 5 is a diagram illustrating a method of collecting data in an AI-based security risk prediction system for targets to be protected in a cloud environment according to an embodiment of the present disclosure.

FIG. 5 is a diagram illustrating a method of collecting data in an AI-based security risk prediction system for targets to be protected in a cloud environment according to an embodiment of the present disclosure. Referring to FIG. 5, the security risk prediction system 100 according to an embodiment of the present disclosure may receive cloud logs from the cloud system 200 through API communication with the cloud system 200 to, and collect system logs from agents 400 installed in a virtual host 21, a container 22, and a database 23.

Figure 6:
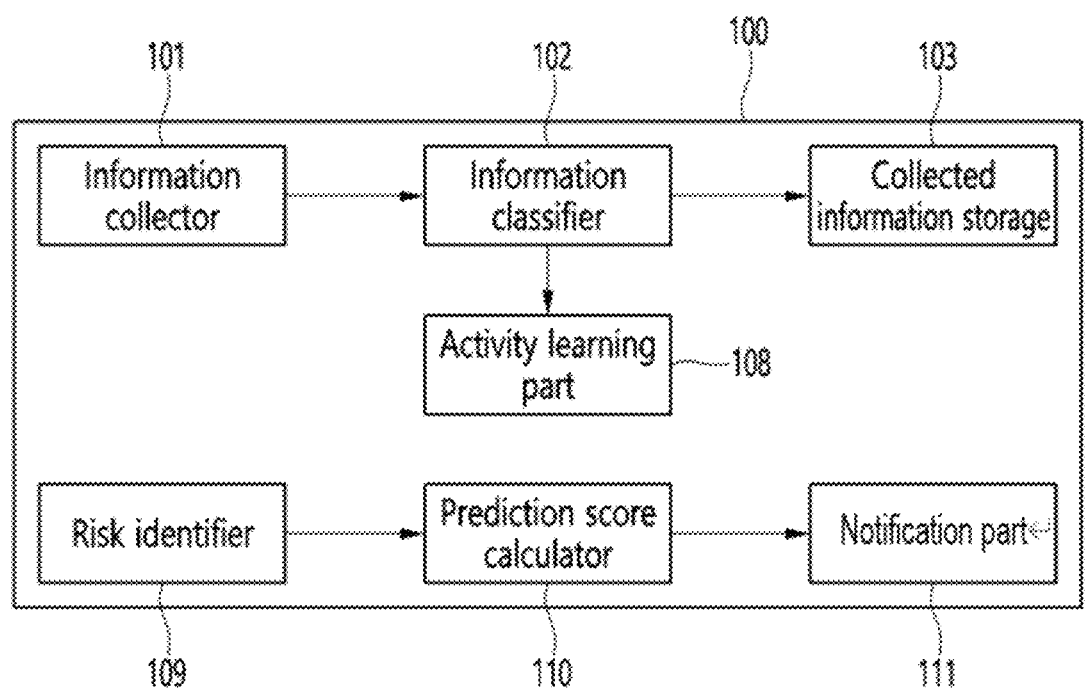
FIG. 6 is a block diagram of an AI-based security risk prediction system for targets to be protected in a cloud environment according to the first embodiment of the present disclosure.

FIG. 6 is a block diagram of an AI-based security risk prediction system for targets to be protected in a cloud environment according to the first embodiment of the present disclosure. Referring to FIG. 6, a security risk prediction system 100 according to an embodiment of the present disclosure may include an information collector 101, an information classifier 102, a collected information storage 103, a risk identifier 109, and a prediction score calculator, and a notification part 111.

The information collector 101 may perform API communication with a cloud system 200 to collect cloud logs and to collect system logs from an agent 400 of each cloud asset. The information classifier 102 may classify the cloud logs and system logs collected by the information collector 101 by member company and by target to be protected, and may store the logs in the collected information storage 103. In a case where the cloud logs and system logs collected by the information classifier 102 are logs related to company A, company B, and company C, the information classified by the information classifier 102 may be classified by company A, company B and company C. Then, the classified information related to company A may be again classified by each individual account owned by company A or may be classified by each cloud asset owned by company A.

The collected information storage 103 may store the information classified by the information classifier 102.

An activity learning part 108 may include an artificial intelligence algorithm. The activity learning part 108 may learn first and second activity logs of a target to be protected, which are collected in real time by the information collector 101, to identify whether a new activity has occurred. When the new activity has occurred, the activity learning part 108 may identify an activity pattern including the new activity.

If an activity to access, an activity to check a specific file after access, an activity to copy the contents after checking the specific file, and an activity to send the copied contents by e-mail or the like are included in a new activity pattern of a first account for a first virtual host and an activity to copy the contents from the new activity pattern and an activity to send the copied contents by e-mail or the like are new activities, the activity learning part 108 may provide the risk identifier 109 with identification information of the first virtual host, identification information of the first account, and the new activity pattern (or the new activities).

When a new activity and a new activity pattern for each target to be protected are received from the activity learning part 108, the risk identifier 109 may identify an order of a preparatory activity for the new activity in the activity pattern and then may provide the identified order to the prediction score calculator 110.

The prediction score calculator 110 may identify an order of a preparatory activity for the new activity of a target to be protected, which is received from the risk identifier 109, identify a preset risk score for the identified order, and calculate a risk score of the target to be protected by summing by summing risk scores of new activities. In this case, when the calculated risk score is a first calculated risk score of the target to be protected, the risk score may be a primary risk score. On the other hand, when there is a risk score calculated for the corresponding target to be protected before the calculated risk score, the currently calculated risk score may be a secondary risk score. When the currently calculated risk score is a secondary risk score, the prediction score calculator 110 may calculate a final risk score by summing the secondary risk score and the primary risk score.

The notification part 111 may displays the result calculated by the prediction score calculator 110 in the form of a risk status according to a risk score of each target to be protected or may notify a person in charge of the member company of the calculated result.

Meanwhile, the security risk prediction system 100 according to the first embodiment of the present disclosure may include a communication device, a data processor, and a memory. The communication device may include the information collector 101 and the notification part 111, and data, and the processor may include the information classifier 102, the activity learning part 108, the risk identifier 109, and the prediction score calculator 110. In particular, the activity learning part 108 may be artificial intelligence software. The memory may include the collected information storage 103 and a diagnostic result storage 105.

Each of the components 101 to 111 may be configured as software performing each function or may be configured as hardware in which software performing each function is installed.

Figure 7:
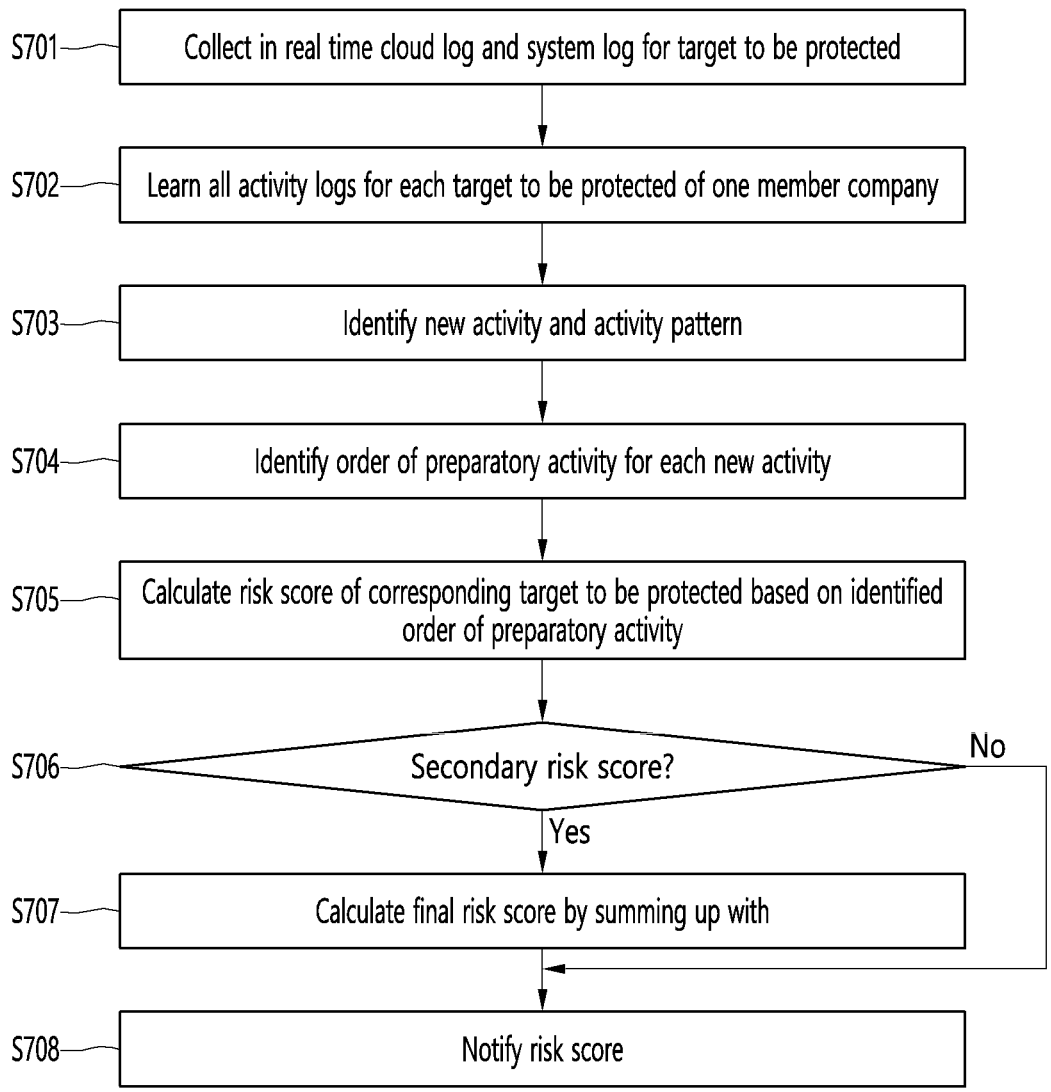
FIG. 7 is a flowchart illustrating an AI-based security risk prediction method according to the first embodiment of the present disclosure.

FIG. 7 is a flowchart illustrating an AI-based security risk prediction method according to an embodiment of the present disclosure. Referring to FIG. 7, an AI-based security risk prediction system (hereinafter, referred to as "system") 100 for targets to be protected in a cloud environment according to the first embodiment of the present disclosure may collect and store cloud logs and system logs for the respective targets to be protected in real time in operation S701.

The system 100 may provide a security risk prediction service for each member company. In an example where one member company is targeted to provide a better understanding, all activity logs for the respective targets to be protected of the corresponding member company may be first learned through an AI algorithm in operation S702.

The system 100 may identify a new activity, which has not occurred so far, among activities for the corresponding respective targets to be protected, based on a learning process through the AI algorithm, and in response to the new activity being identified as a new activity related to security, identify a first activity pattern including the new activity in operation S703.

The system 100 may identify an order of a preparatory activity for the new activity in the activity pattern in operation S704. Then, the system 100 may identify a risk score corresponding to the order of a preparatory activity for the new activity and calculate a risk score of each target to be protected by summing identified risk scores of new activities in operation S705.

When the calculated risk score is a secondary risk score in operation S706, the system 100 may calculate a final risk score by summing the secondary risk score and a primary risk score of a corresponding target to be protected in operation S707. Then, the system 100 may notify the final risk score of the corresponding target to be protected to a person in charge of the member company in operation S708.

Of course, when the calculated risk score is a primary risk score, the system 100 may notify the calculated risk score as the primary risk score to the person in charge of the member company.

Figure 8:
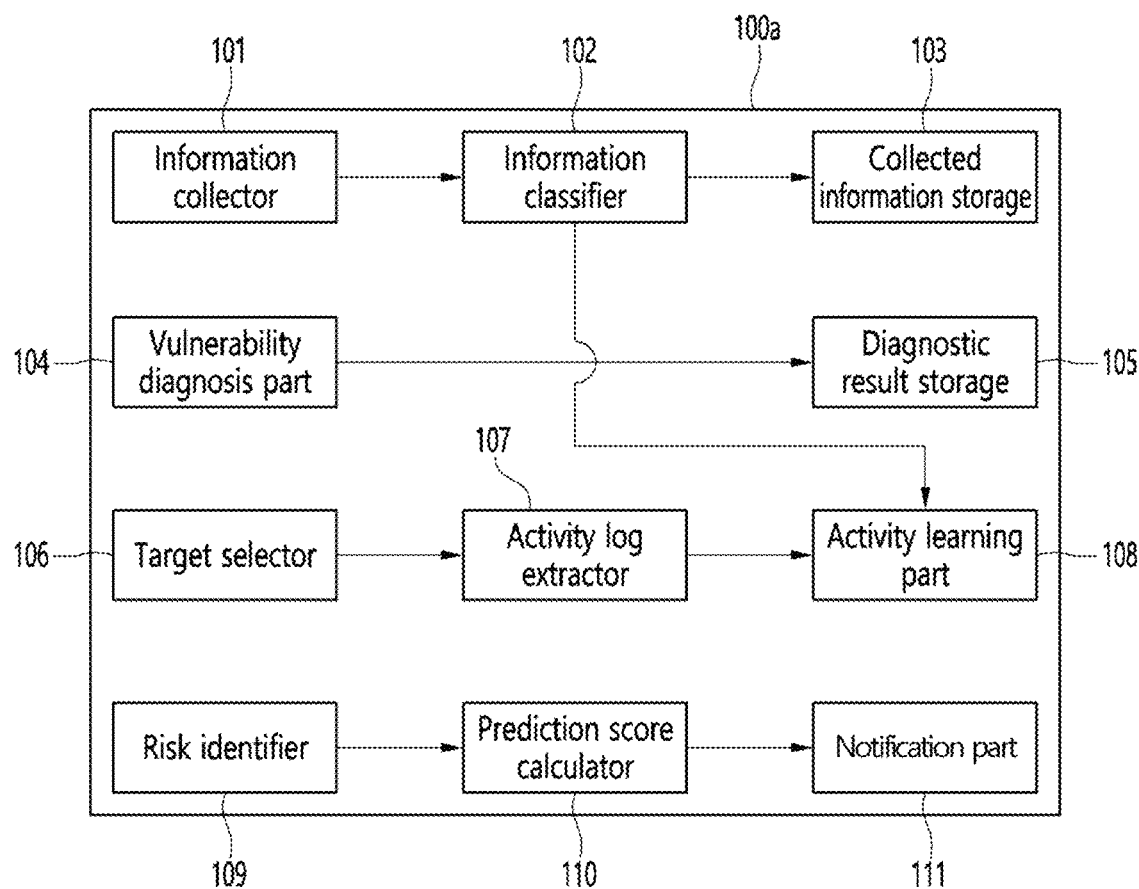
FIG. 8 is a block diagram of an AI-based security risk prediction system for targets to be protected in a cloud environment according to the second embodiment of the present disclosure.

FIG. 8 is a block diagram of an AI-based security risk prediction system for targets to be protected in a cloud environment according to the second embodiment of the present disclosure. Referring to FIG. 8, a security risk prediction system (hereinafter, referred to as "system") 100a according to an embodiment of the present disclosure may include an information collector 101, an information classifier 102, and a collected information storage 103, a vulnerability diagnosis part 104, a diagnostic result storage 105, a target selector 106, an activity log extractor 107, an activity learning part 108, a risk identifier 109, a prediction score calculator 110, and a notification part 111.

The information collector 101 may perform API communication with a cloud system 200 to collect cloud logs and to collect system logs from an agent 400 of each cloud asset. The information classifier 102 may classify the cloud logs and system logs collected by the information collector 101 by member company and target to be protected, and may stores the logs in the collected information storage 103. In a case where the cloud logs and system logs collected by the information classifier 102 are logs related to company A, company B, and company C, the information classified by the information classifier 102 may be classified by company A, company B and company C. Then, the classified information related to company A may be again classified by each individual account owned by company A or may be classified by each cloud asset owned by company A.

The collected information storage 103 may store the information classified by the information classifier 102.

The vulnerability diagnosis part 104 may perform vulnerability diagnosis on each member company's target to be protected by using vulnerability diagnosis information among log information stored in the collected information storage 103. The vulnerability diagnosis information may be information used for vulnerability diagnosis among log information. For example, the vulnerability diagnosis part 104 may evaluate each vulnerability diagnosis item (check item) based on vulnerability diagnosis information for the company A's target to be protected, calculate a result of evaluation for each vulnerability diagnosis item (check item) as a score, and calculate a vulnerability diagnosis score by averaging calculated scores.

In this case, vulnerability diagnosis information may correspond to items for vulnerability diagnosis (check items) shown in FIG. 11, and the items for vulnerability diagnosis (check items) may be already determined by domestic and international regulations. A vulnerability diagnosis method performed by the vulnerability diagnosis part 104 may be at least from among well-known vulnerability diagnosis methods for a target to be protected. As for the vulnerability diagnosis score, the weaker the security, the higher the score, and the weaker the security, the lower the score. Hereinafter, it is assumed that a vulnerability diagnosis score is calculated lower when security is weaker.

The diagnostic result storage 105 may store a diagnostic result from diagnosis on a target to be protected for each member company, the diagnosis periodically performed by the vulnerability diagnosis part 104. Therefore, diagnostic results of each target to be protected may be accumulated in a chronical order, of which a series of corresponding vulnerability diagnosis is performed, and may be stored in the diagnostic result storage 105.

The target selector 106 may identify and manage a vulnerability status of each target to be protected based on a result of previously performed vulnerability diagnosis, identify a current vulnerability status of a corresponding target to be protected based on a result of currently performed diagnosis, and reflect the identified current vulnerable status to the pre-stored vulnerability status of the corresponding target to be protected. In this case, the target selector 106 may newly add a target to be protected whose current vulnerability status has changed from a safe status or a concerned status to an insecure status as a target at security risk and may select the target as a first prediction target. In addition, the target selector 106 may exclude, from targets at security risk, a target to be protected whose current vulnerability status has changed from an insecure status to a concerned status or a safe status. That is, the target selector 106 may exclude, from second prediction targets, the target to be protected whose current vulnerability status has changed from the insecure status to the concerned status or the safe status from the.

The vulnerability status of a target to be protected may be divided into, for example, a safe status, which is the most stable status, a concerned status in which the number of vulnerable items is less than or equal to a first number, and an insecure status in which the number of vulnerable items is equal to or greater than a second number. Of course, the vulnerability status of the target to be protected may be classified differently by each designer.

In a process of identifying the vulnerability status, the target selector 106 may compare a latest diagnostic result (that is, a vulnerability diagnosis score) stored in the diagnostic result storage 105 with a set first reference score select a target to be protected with a vulnerability diagnosis score lower than the first reference score, that is, a target to be protected with high security vulnerability, as a target at security risk, and set a vulnerability status of a corresponding cloud to an insecure status. In addition, the target selector 106 may compare a latest vulnerability diagnosis score of each target to be protected stored in the diagnostic result storage 105 with a set second reference score, and in response to the second reference score being higher than the second reference score, set a vulnerability status of a corresponding target to be protected to a safe status. In the above, the second reference score may be set higher than the first reference score.

The change in the vulnerability status of a target to be protected from an insecure status to a safe status may be determined to mean that an action has been taken by an administrator or that an element causing the insecure status has been solved because an account causing the vulnerability status of the target to be the insecure status does not have any malicious intent. When the account causing the vulnerability status of the target to the insecure status has any malicious intent, the vulnerability status may be maintained as the insecure status if there is no action by the administrator.

The activity log extractor 107 identifies a vulnerability progress period in which the vulnerability status of a first prediction target selected by the target selector 106 has changed from a safe status to an insecure status, extract activity logs, that is, first and second activity logs during the vulnerability progress period, and provide the activity learning part 108 with the extracted first and second activity logs.

The activity learning part 108 may include an artificial intelligence algorithm. The activity learning part 108 may learn the first and second activity logs of the first prediction target, received from the activity log extractor 107, to identify whether a first new activity has occurred. When the first new activity has occurred, the activity learning part 108 may identify a first activity pattern including the first new activity. In addition, the activity learning part 108 may learn the first and second activity logs for each of the first and second prediction targets, which are collected in real time by the information collector 101, to identify whether a second new activity has occurred. When the second new activity has occurred, the activity learning part 108 may identify a second activity pattern including the second new activity.

The activity learning part 108 may provide the first new activity and the first activity pattern for the first prediction target to the risk identifier 109, and the second new activity and the second activity pattern for the first and second prediction target the risk identifier 109.

If an activity to access, an activity to check a specific file after access, an activity to copy the contents after checking the specific file, and an activity to send the copied contents by e-mail or the like are included in a new activity pattern of a first account for a first virtual host and an activity to copy the contents from the new activity pattern and an activity to send the copied contents by e-mail or the like are new activities, the activity learning part 108 may provide the risk identifier 109 with identification information of the first virtual host, identification information of the first account, and the new activity pattern (or the new activities).

When the first new activity and the first activity pattern of the first prediction target are received from the activity learning unit 108, the risk identifier 109 may identify an order of a preparatory activity for the first activity in the first activity pattern and may provide the identified order to the prediction score calculator 110. When the second new activity and the second activity pattern of each of the first and second prediction targets are received from the activity learning part 108, the risk identifier 109 may identify an order of a preparatory activity for the second new activity in the second activity pattern and may provide the identified order to the prediction score calculator 110.

The prediction score calculator 110 may identify an order of a preparatory activity for the first new activity of the first prediction target, received from the risk identifier 109, identify a preset risk score of the identified order, and calculate a primary risk score of the first prediction target by summing risk scores of first new activities. The prediction score calculator 110 may calculate a secondary risk score of the first prediction target and a secondary risk score of the second prediction target based on the second new activity of the first prediction target and the second new activity of the second prediction target, which are received from the risk identifier 109.

Here, a method of calculating the secondary risk score of the first prediction target and a method of calculating the secondary risk score of the second prediction target may be the same. In an example of the method for calculating the secondary risk score of the first prediction target, the prediction score calculator 110 may calculate the secondary risk score by identifying a preset risk score corresponding to the order of a preparatory activity for the second new activity of the first prediction target and then summing identified risk scores of all second new activities.

Then, the prediction score calculator 110 may calculate a final risk score by summing the secondary risk score and the primary risk score of the first prediction target.

The notification part 111 may displays the result calculated by the prediction score calculator 110 in the form of a risk status according to a risk score of each target to be protected or may notify the calculated result to a person in charge of the member company.

Meanwhile, a security risk prediction system 100a according to the second embodiment of the present disclosure may include a communication device, a data processor, and a memory. The communication device may include an information collector 101 and a notification part 111. The data processor may include an information classifier 102, a vulnerability diagnosis part 104, a target selector 106, an activity log extractor 107, an activity learning part 108, a risk identifier 109, and a prediction score calculator 110. In particular, the activity learning part 108 may be artificial intelligence software. The memory may include the collected information storage 103 and a diagnostic result storage 105.

Each of the components 101 to 111 may be configured as software performing each function or may be configured as hardware in which software performing each function is installed.

Figure 9:
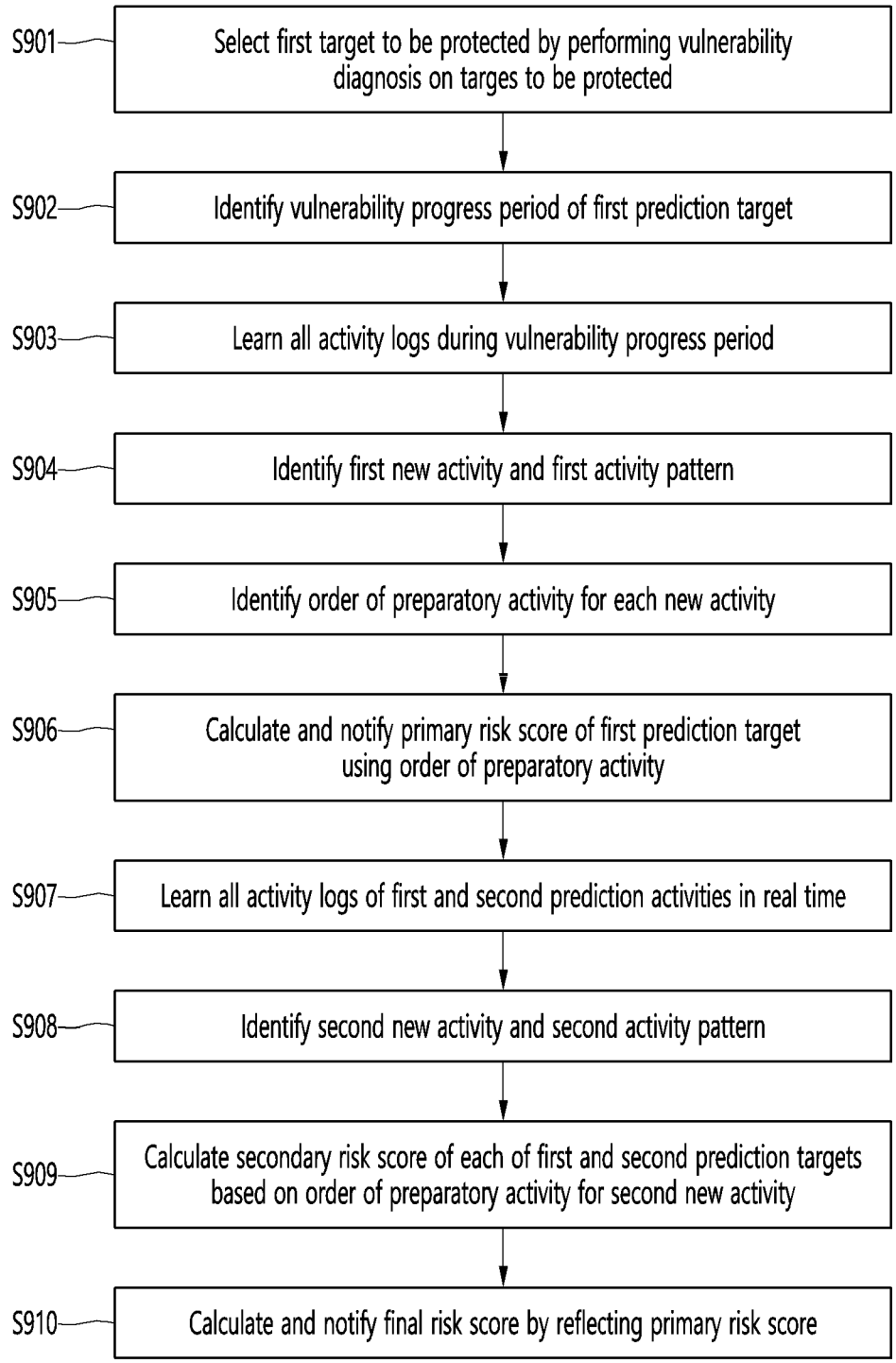
FIG. 9 is a flowchart illustrating an AI-based security risk prediction method according to the second embodiment of the present disclosure.

FIG. 9 is a flowchart illustrating an AI-based security risk prediction method according to a second embodiment of the present disclosure. Referring to FIG. 6, a system 100a of the present disclosure may perform vulnerability diagnosis based on cloud logs and system logs for targets to be protected of each member company and may select a target to be protected of which a vulnerability status has changed from a stable status or a concerned state to an insecure status according to a result of the vulnerability diagnosis as a first prediction target in operation S901.

For example, the system 100a may perform the operation S901 on each target to be protected of the company A, then perform the operation S901 on each target to be protected of company B, and then perform the operation S901 sequentially on company C and company D.

In the above, the first prediction target may be one or more targets to be protected, for example, three individual accounts, five individual accounts, two virtual hosts, or two virtual hosts and one container.

When there is a plurality of first prediction targets, the system 100a of the present disclosure performs the following operations S902 to S910 on each of the first prediction targets. For example, when there are three first prediction targets, the system 100a may first perform the following steps S902 to S910 on a first prediction target, then perform the following operations S902 to S910 on a second first prediction target, and lastly perform the following operation S902 to S910 on a third first prediction target.

Hereinafter, in order to provide a better understanding, it is assumed that there is one first prediction target.

The system 100a may identify a vulnerability progression period of a first prediction target in operation S902 and then extract an activity log related to the first prediction target during the vulnerability progression period and learn the extracted activity log through an AI algorithm in operation S903.

The system 100a may identify a new activity, which has never occurred among activities for the first prediction target, based on a learning process through the AI algorithm, determine whether the identified new activity is a first new activity related to security, and identify a first new activity pattern including the first activity in operation S904.

Then, the system 100a may identify an order of a preparatory activity for the first new activity in the first activity pattern in operation S905. Here, the first activity pattern including the first new activity may be preset information, and a second activity pattern described below may also be preset information.

The system 100a may identify a risk score corresponding to the order of a preparatory activity for each first new activity, calculates a primary risk score of the first prediction target by summing identified risk scores of first new activities, and notify the calculated primary risk score of the first prediction target to a person in charge of a corresponding company member in operation S906. The system 100a may learn first and second activity logs, which are received in real time, for each of the first prediction target and a second prediction target in operation S907 by inputting the first and second activity logs to the AI algorithm.

The system 100a may identify a new activity, which has never occurred, based on a learning process through the AI algorithm, determine whether the identified new activity is a second new activity related to security, and identify a second activity pattern including the second new activity in operation S908.

The system 100a may identify the order of a preparatory activity for the second new activity in the second activity pattern, identify a risk score corresponding to the order of a preparatory activity for each second new activity, and calculate a secondary risk score of the first prediction target and a secondary risk score of the second prediction target by summing identified risk scores of second new activities in operation S909.

Then, the system 100a may calculate a final risk score of the first prediction target by adding the secondary risk score of the first prediction target to the primary risk score of the first prediction target, calculate a final risk score of the second prediction target by adding the secondary risk score of the second prediction target to the primary risk score of the first prediction target, and then notify a person in charge of the corresponding member company of the respective final risk scores in operation S910.

Figure 10:
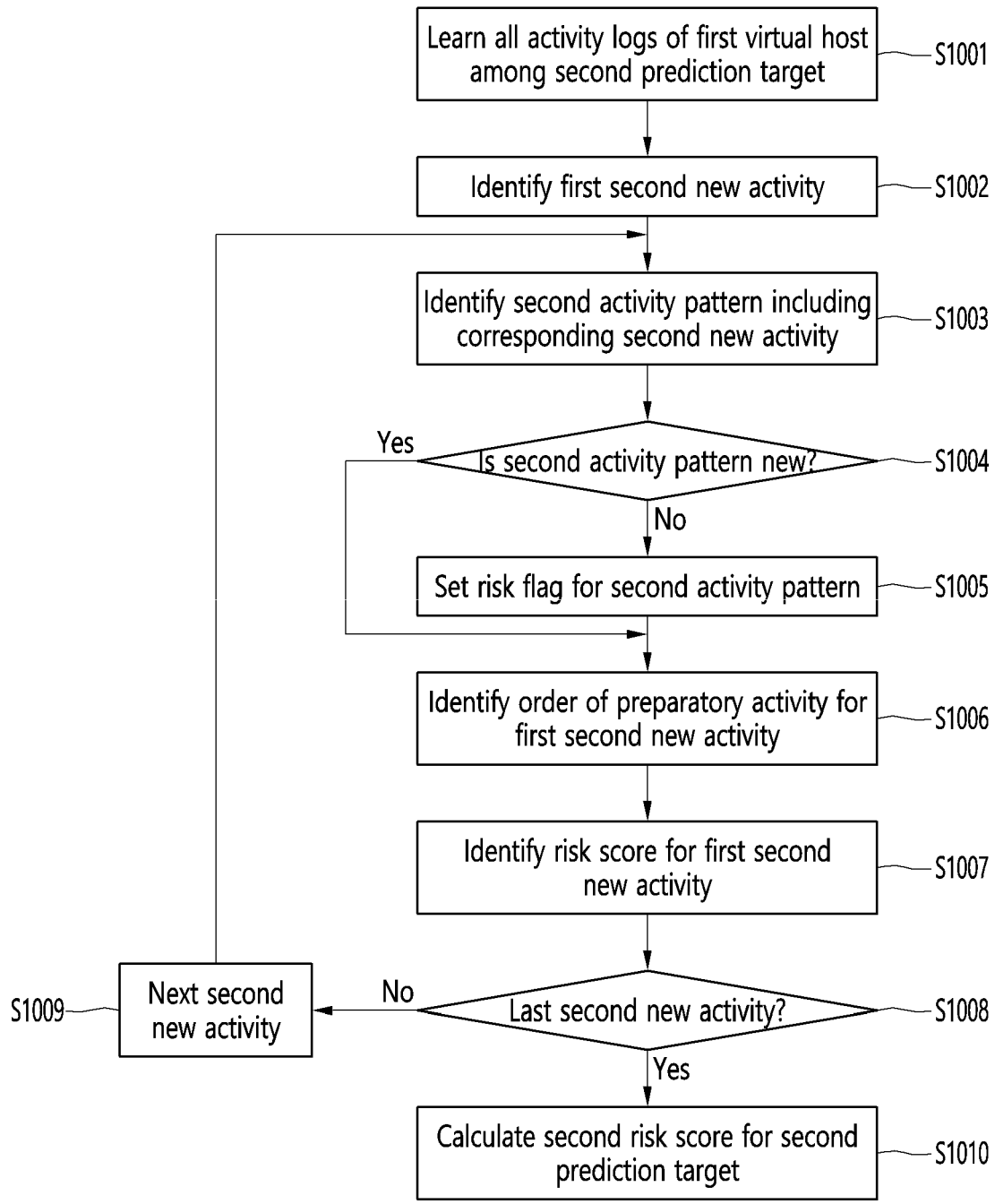
FIG. 10 is a flowchart illustrating a method for calculating a secondary risk score according to an embodiment of the present disclosure.

FIG. 10 is a flowchart illustrating a method for calculating a secondary risk score according to an embodiment of the present disclosure, which is an example different from the method for calculating a secondary risk score described with reference to FIG. 9. In addition, FIG. 10 will be described with reference to a second prediction target among first and second prediction targets.

Referring to FIG. 10, a system 100a calculates a secondary risk score of a first virtual host, which is a cloud asset, among a plurality of second prediction targets.

To this end, the system 100a may learn first and second activity logs, which are received in real time, for the first virtual host by inputting the first and second activity logs to an AI algorithm in operation S1001, and identify a first second new activity in operation S1002.

When the system 100a may identify the first second new activity, the system 100a may identify a second activity pattern including the first second new activity in operation S1003, and determine whether the identified second activity pattern is the first activity pattern identified for the first virtual host, that is, a new activity pattern in operation S1004.

When the second activity pattern is not a new activity pattern but a previously identified activity pattern, the system 100a may determine that the first second new activity is a preparatory activity with a higher order in the previously identified activity pattern. That is, the system 100a may determine that the first second new activity is a preparatory activity more likely to be a malicious activity B of the corresponding activity pattern. Accordingly, the system 100a may set a risk flag for the second activity pattern in operation S1005.

Here, the risk flag may be differentially displayed depending on the order of the preparatory activity for the first second new activity in the second activity pattern. For example, when the first second new activity is right before the malicious activity B, a risk flag to indicate a risk may be displayed, and when the first second new activity is less likely to be the malicious activity B, a risk flag to indicate a less risk may be displayed.

Setting the risk flag may be performed by the risk identifier 109.

Meanwhile, when the second activity pattern is a new activity pattern, the system 100a may determine that the first second new activity is not related to a previously monitored preparatory activity, and then identify an order of a preparatory activity for the first second new activity in operation S1006.

Of course, the system 100a may identify the order of the preparatory activity for the first second new activity in the second activity pattern after setting a risk flag in operation S1006, and identify a risk score corresponding to the order of the preparatory activity for the first second new activity in operation S1007.

The system 100a may determine whether a next second new activity is identified in operation S1008, and in response to the next second new activity being identified S1009, perform the operations S1003 to S1007 with respect to the next second new activity.

Then, when it is determined that the second new activity undergone through the operations S1003 to S1007 is a last second new activity, the system 100 may calculate a secondary risk score by summing risk scores of respective new activities to the others in operation 51010.

In the present disclosure, it is possible to predict a possibility of malicious threat before any malicious threat such as hacking occurs, and to block a malicious threat in advance by notifying the possibility to a relevant member company.

In addition, in the present disclosure, it is possible to identify an account exhibiting a possibility of malicious threat, and to block a malicious threat in advance by notifying the possibility to a relevant member company.

Technical features disclosed in each embodiment of the present disclosure are not limited to the embodiment, and unless they are mutually incompatible, the technical features disclosed in the embodiment may be combined and applied to a different embodiment.

Accordingly, in each embodiment, technical features will be mainly described, but unless the technical features are incompatible with each other, they may be combined and applied.

The present disclosure is not limited to the above-described embodiments and the accompanying drawings, and various modifications and variations will be possible from the point of view of those of ordinary skill in the art to which the present disclosure pertains. Accordingly, the scope of the present disclosure should be defined not only by the claims of the present specification, but also by those claims and their equivalents.

What is claimed is:

1. An artificial intelligence (AI)-based security risk prediction system for targets to be protected in a cloud environment, the system comprising:
an information collector configured to perform API communication with a cloud system to collect cloud logs and collect system logs from agents of cloud assets;
an information classifier configured to classify and store the cloud logs and the system logs by each member company and each target to be protected;
an activity learning part configured to learn an activity log collected in real time by the information collector so as to identify whether a new activity has occurred, and in response to occurrence of the new activity, identify an activity pattern comprising the new activity;
a risk identifier configured to, in response to receiving the new activity and the activity pattern for the each target to be protected, identify an order of a preparatory activity for the new activity in the activity pattern;
a prediction score calculator configured to identify the order of the preparatory activity for the new activity, identify a preset risk score of the identified order, and calculate a risk score of a corresponding target to be protected by summing risk scores of all new activities;

a vulnerability diagnosis part configured to perform vulnerability diagnosis on the each target to be protected of the each member company based on vulnerability diagnosis information included in the cloud logs and the system logs;

a target selector configured to identify and manage a vulnerability status of the each target to be protected based on a result of the vulnerability diagnosis performed by the vulnerability diagnosis part, and select a first prediction target, which is a new security threat object, based on a result of currently performed vulnerability diagnosis on the each target to be protected; and an activity log extractor configured to identify a vulnerability progress period in which a vulnerability status of the first prediction target has changed from a safe status to an insecure status, and extract an activity log of the vulnerability progress period, wherein the activity learning part is further configured to identify a first new activity of the first prediction target and a new activity pattern including the first new activity by learning the activity log during the vulnerability progress period, and identify a second new activity of each of the first prediction target and a preset second prediction target and a second activity pattern including the second new activity by learning a real-time activity log for each of the first and second prediction targets, wherein the risk identifier is further configured to identify, within each of the first and second activity patterns, an order of a plurality of preparatory activities including the first new activity and the second new activity, respectively, the order indicating a progression toward a malicious activity, and wherein the prediction score calculator is further configured to:
(i) identify a preset risk score corresponding to the order of the preparatory activity for the first new activity of the first prediction target;
ii) calculate a primary risk score of the first prediction target by summing the preset risk scores identified for the first new activities;
(iii) identify a preset risk score corresponding to the order of the preparatory activity for the second new activity of each of the first and second prediction targets;
(iv) calculate a secondary risk score of each of the first and second prediction targets by summing the preset risk scores identified for the second new activities; and
(v) calculate a final risk score of each of the first and second prediction targets by summing the primary and secondary risk scores.

2. The system of claim 1, wherein the corresponding target to be protected is at least one of all individual accounts and all cloud assets owned by the each member company.

3. The system of claim 1, wherein the risk identifier is further configured to: in response to the second activity pattern being a new activity pattern, identify an order of a preparatory activity for the second new activity, and in response to the second activity pattern being not a new activity pattern but a previously identified activity pattern, set a risk flag for the second activity pattern.

4. An artificial intelligence (AI)-based security risk prediction method for targets to be protected in a cloud environment, the method comprising:
performing vulnerability diagnosis on the targets to be protected based on cloud logs and system logs for the targets to be protected of each member company;
selecting, as a first prediction target, a target to be protected of which a vulnerability status has changed to an insecure status according to a result of the vulnerability diagnosis among the respective targets to be protected;
identifying a vulnerability progress period for the first prediction target;
extracting an activity log related to the first prediction target during the vulnerability progress period and learning the extracted activity log through an AI algorithm;
identifying a first new activity for the first prediction target and a first activity pattern including the first new activity based on a learning process through the AI algorithm;
identifying an order of a preparatory activity for the first new activity in the first activity pattern;
identifying a risk score corresponding to the order of the preparatory activity for the first new activity;
calculating a primary risk score of the first prediction target by summing any of the identified risk score of the first new activity;
learning, through the AI algorithm, an activity log received in real time for each of the first prediction target and a second prediction target preset in the insecure status;
identifying a second new activity of each of the first and second prediction targets and a second activity pattern including the second new activity based on a learning process through the AI algorithm;
identifying, within each of the first and second activity patterns, an order of a plurality of preparatory activities including the first new activity and the second new activity, respectively, the order indicating a progression toward a malicious activity;
identifying a preset risk score corresponding to the order of the preparatory activity for the first new activity of the first prediction target;
calculating a primary risk score of the first prediction target by summing the preset risk scores identified for the first new activities;
identifying a preset risk score corresponding to the order of the preparatory activity for the second new activity of each of the first and second prediction targets;
calculating a secondary risk score of each of the first and second prediction targets by summing the preset risk scores identified for the second new activities; and
calculating a final risk score of each of the first and second prediction targets by summing the primary and secondary risk scores.

5. The method of claim 4, further comprising:
setting a risk flag for the second activity pattern in response to the second activity pattern being not a new activity pattern but a previously identified activity pattern.

6. The method of claim 4, wherein the target to be protected is at least one of all individual accounts and all cloud assets owned by the each member company.

* * * * *